United States Patent

Nakada et al.

(10) Patent No.: US 6,715,745 B2
(45) Date of Patent: Apr. 6, 2004

(54) LIQUID-SEALED MOUNT

(75) Inventors: Kuniaki Nakada, Yokohama (JP);
Mitsuo Kuzukawa, Kounosu (JP)

(73) Assignees: Komatsu Ltd. (JP); Fukoku Co., Ltd. (JP)

( * ) Notice: Subject to any disclaimer, the term of this patent is extended or adjusted under 35 U.S.C. 154(b) by 0 days.

(21) Appl. No.: 10/237,711

(22) Filed: Sep. 10, 2002

(65) Prior Publication Data

US 2003/0047882 A1 Mar. 13, 2003

(30) Foreign Application Priority Data

Sep. 12, 2001 (JP) ........................... 2001-276428

(51) Int. Cl.[7] ............................... F16F 13/00
(52) U.S. Cl. ............ 267/140.13; 267/219; 267/140.12; 277/916
(58) Field of Search ............... 277/628, 916; 267/140.11, 140.12, 140.13, 219, 35; 248/636

(56) References Cited

U.S. PATENT DOCUMENTS

| 4,610,438 | A | * | 9/1986 | Eberhard et al. | ............ | 267/220 |
| 5,516,176 | A | * | 5/1996 | Kimoto et al. | ............. | 296/35.1 |
| 5,707,048 | A | * | 1/1998 | Kuzukawa et al. | .... | 267/140.13 |

FOREIGN PATENT DOCUMENTS

| JP | 7-127683 | | 5/1995 | | |
| JP | 07224883 A | * | 8/1995 | ............ | F16F/13/14 |
| JP | 07269635 A | * | 10/1995 | ............ | F16F/13/08 |
| JP | 08254241 A | * | 10/1996 | ............ | F16F/13/10 |
| JP | 08338468 A | * | 12/1996 | ............ | F16F/13/08 |
| JP | 11210807 A | * | 8/1999 | ............ | F16F/13/08 |
| JP | 2000249181 A | * | 9/2000 | ............ | F16F/9/10 |
| JP | 2001-241488 | | 9/2001 | | |

* cited by examiner

Primary Examiner—Anthony Knight
Assistant Examiner—Vishal Patel
(74) Attorney, Agent, or Firm—Rader, Fishman & Grauer PLLC

(57) ABSTRACT

A liquid-sealed mount capable of obtaining excellent damping performance is provided. For this purpose, the mount includes an elastic body (16), a stud (13) penetrating through the elastic body, a case (51), which is in a cylindrical shape with one end side being opened and with a bottom face on the other end side, and houses a viscous liquid (L) inside, and in which the viscous liquid is sealed by fitting the elastic body and the stud into the opening at the one end side, a damping member (14) attached to the stud in a state in which the damping member submerges in the viscous liquid; and a wall surface of a portion of the case, which submerges in the viscous liquid, is formed so that an inner diameter gradually decreases toward a lower position and an angle of inclination is different in an upper part from a lower part; and an outer circumferential side surface of the damping member opposes the inclined surface of the case.

2 Claims, 10 Drawing Sheets

LIQUID-SEALED MOUNT

TECHNICAL FIELD

The present invention relates to a liquid-sealed mount.

BACKGROUND ART

In a working vehicle such as a hydraulic shovel, a cab is mounted on a vehicle body frame via a liquid-sealed mount to reduce transmissibility of vibrations and impacts, which occur during a working operation and traveling, to a cab.

FIG. 10 is a sectional view showing a first example of a conventional liquid-sealed mount. A damping member 34 attached at a lower end of a stud 33 is housed inside a cylindrical case 31 having a bottom face. The dumping member 34 is formed into a disc-shape having a little smaller diameter than an inner diameter of the case 31 to form a ring-shaped clearance between an outer circumferential portion thereof and the case 31. The stud 33 is attached at a position of an axis of a cylindrical elastic body 36 inserted in the case 31, and is held by the case 31 via the cylindrical elastic body 36. A recessed portion 36a is formed on an undersurface of the elastic body 36. A viscous liquid L is sealed up to a midpoint of the recessed portion 36a inside the case 31 sealed by the elastic body 36, and an air chamber sealed by the viscous liquid L is formed in an upper part in the recessed portion 36a.

The case 31 and the stud 33 are mounted to either the cab or the vehicle body frame, respectively. Vibrations and impacts occurring to the vehicle relatively move the case 31 and the stud 33, and the damping member 34 agitates the viscous liquid L. A damping force occurring at this time causes a buffering action to work, which reduces the vibrations and impacts transmitted to the cab.

FIG. 11 shows a second example of the conventional liquid-sealed mount, which is a sectional view showing a liquid-sealed mount disclosed in Japanese Patent Laid-open No. 7-127683 that can prevent breakage of an elastic body even when a large load acts thereon to cause a large displacement.

A damping member 44 attached to a lower end of a stud 43 is housed inside a cylindrical case 41 having a bottom face. The damping member 44, which has an orifice hole 44a vertically penetrating it, forms a disc-shape having a little smaller diameter than an inner diameter of the case 41, and a ring-shaped clearance is formed between an outer circumferential portion thereof and the case 41. A coil spring 48 is provided between the case 41 and the damping member 44, and upper and lower ends thereof are connected to the bottom face of the case 41 and the damping member 44, respectively. A sleeve 47 is attached to an inner circumference of a cylindrical elastic body 46 attached in an upper part of the case 41, and the stud 43 is hermetically in contact with an inner circumference of the sleeve 47 and is held to be vertically slidable. A bellows 49 is integrally formed at a lower end of the elastic body 46, and a lower end portion of the bellows 49 is hermetically attached to an attached portion of the damping member 44 and the stud 43. The viscous liquid L is sealed inside the case 41 sealed by the elastic body 46, the bellows 49 and the damping member 44.

Even if a large load acts on the stud 43, it is supported by the spring 48 and the load does not act on the elastic body 46, and therefore breakage of the elastic body 46 can be prevented. Cushioning, in a vertical direction is performed by the dumping member 44 and the spring 48, and cushioning in a lateral direction is performed by the elastic body 46. Both of the cushioning actions reduce the vibrations and impacts transmitted to the cab.

However, the above-described conventional liquid-sealed mount has the following disadvantages.

The damping force is caused by pressure loss of the viscous liquid L which is throttled in the clearance from the cases 31 and 41 due to a pressure difference between upper sides and lower sides to the damping members 34 and 44 to flow. Consequently, in the direction in which the studs 33 and 43 descend, the lower sides of the damping members 34 and 44 are at high pressure and the pressure difference from the upper side becomes large, thus making it possible to obtain a large damping force. However, in the direction in which the studs 33 and 43 ascend, the air inside the recessed portion 36a is compressed in the first example of the prior art, and the air inside the bellows 49 is compressed to contract the bellows 49 in the second example of the prior art. Therefore, the upper sides of the damping members 34 and 44 are never at sufficient high pressure. Consequently, the pressure differences between the upper sides and the lower sides of the damping members 34 and 44 cannot be sufficiently large, and the damping force is reduced.

Further, when a large load in a rising direction is exerted on the studs 33 and 43, the pressure in the upper sides of the damping members 34 and 44 do not become sufficiently high, and the pressure differences corresponding to the load occur between both sides of the damping members 34 and 44. As a result, the pressure in the lower sides of the damping members 34 and 44 is reduced to cause cavitation, and the flow of the viscous liquid L flowing through the aforementioned clearance is extremely reduced, thus reducing the damping force to a large extent.

SUMMARY OF THE INVENTION

To eliminate the above-described disadvantage, the present invention has its object to provide a liquid-sealed mount, which is capable of obtaining excellent damping performance.

In order to attain the above-described object, the liquid-scaled mount according to the present invention has a constitution including an elastic body, a stud penetrating through the elastic body;

a case, which is in a cylindrical shape with one end side being opened and with a bottom face on the other end side, houses a viscous liquid in an inside thereof, and which the viscous liquid is sealed in by fitting the elastic body and the stud into the opening at the one end side, and a damping member attached to the stud in a state in which the damping member submerges in the viscous liquid, wherein a wall surface of a portion, which submerges in the viscous liquid, of the case is formed so that an inner diameter gradually decreases toward a lower position and an angle of inclination is different in an upper part from a lower part, and an outer circumferential side surface of the damping member opposes the inclined surface of the case.

According to the above constitution, the clearance between the case and the outer circumferential side surface of the damping member is gradually narrowed following the descent of the stud (namely, the descent of the damping member), and therefore the damping force caused by pressure loss of the viscous liquid passing through this clearance can be smoothly made larger, and a large damping force can be obtained according to the vibration width, namely, when the width of vibration is large. Further, the angle of inclination of the inclined surface of the case is formed in a plurality of stages, whereby the damping force can be changed in the multiple stages, and therefore the impact that occurs at the time of abutment against the stopper can be cushioned by setting the damping force to be large before the stud or the like abuts against the stopper. The damping force can be set optionally by optionally setting a plurality of angles of inclination of the case.

Further, in the liquid sealed mount, the constitution in which an outer diameter of the damping member is larger in a lower part than in an upper part may be suitable. According to the above constitution, for the vibration in the lateral direction, which oscillates the upper end portion of the stud, the resultant force of the reaction force, which controls and diminishes the vibration, acts on the lower part of the damping member, and thus a profound vibration controlling effect can be obtained.

BEST MODE FOR CARRYING OUT THE INVENTION

Preferred embodiments according to the present invention will be explained in detail below with reference to the drawings.

Figure 1A:
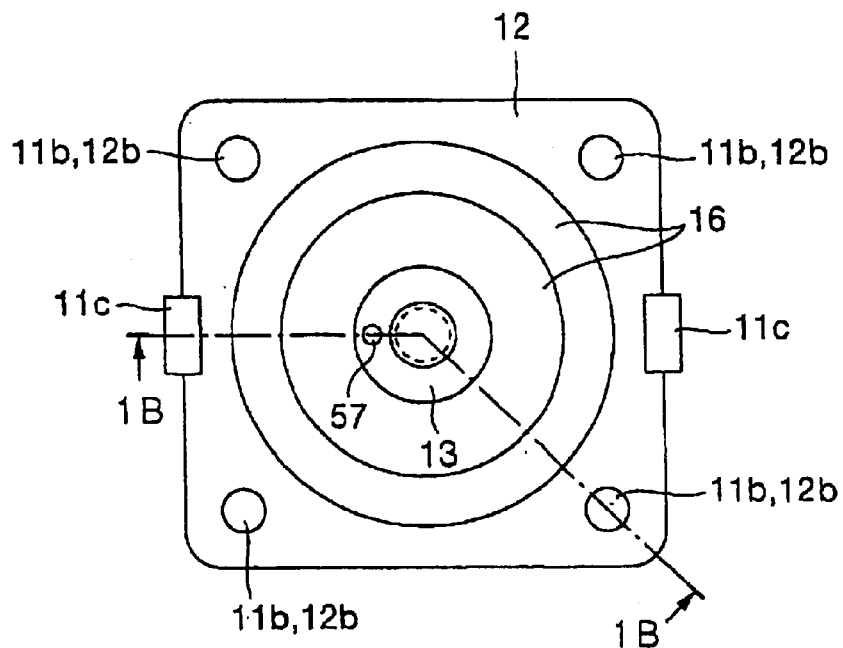
FIG. 1A is a plan view showing a first embodiment of the present invention.
Figure 1B:
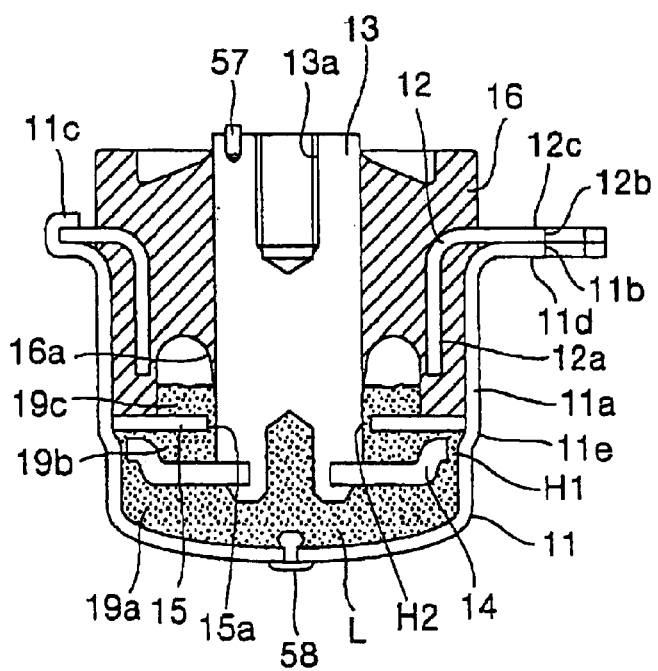
FIG. 1B is a sectional view taken along the line 1B—1B line in FIG. 1A.

A first embodiment will be explained based on FIG. 1A and FIG. 1B at first. FIG. 1A is a plan view of a liquid-sealed mount, and FIG. 1B is a sectional view taken along the 1B—1B line. A case 11 has a cup portion 11a, and a mounting plate 11d provided with a mounting hole 11b and a fixing claw 11e. A step 11e is provided at a slightly lower position in a middle portion of the cup portion 11a, and an inner diameter of the case 11 at a lower part from the step 11e is a little smaller.

A damping member 14 fixed to a lower end of a stud 13 by means of caulking or the like is housed inside the case 11. The damping, member 14 forms a circular shape having a little smaller diameter than the inner diameter of the case at the lower part from the step 11e, and a ring-shaped clearance H1 is formed between an outer circumferential portion thereof and the case 11. The stud 13 is in a circular cylindrical shape having a screw hole 13a in a center of an upper end portion, and a pin 57 for preventing turning is attached at a top end portion.

A damping plate 15 is attached to the step 11e portion of the case 11. The damping plate 15 forms a disc-shape having an outer diameter that is substantially the same as an inner diameter of the case 11 in the upper part from the step 11e, and a hole 15a with a little larger diameter than an outer diameter of the stud 13 is provided in its center to form a ring clearance H2 in a space from the stud 13. Here, the accuracy of dimension of the outer diameter of the stud 13 and the diameter of the hole 15a of the damping plate 15 is secured when the materials are worked, and an amount of lateral elastic deformation of the elastic body 16 is not so large, whereby the clearance H2 with dimensional accuracy being maintained and stable quality is formed.

The damping plate 15 is formed to be a ring shape as a whole, and is constructed integrally, or by a plurality of separate components. Except for the constitution in which the damping plate 15 is attached to the step 11e portion as described above, the damping plate 15 may be attached to, for example, a pin or a protruding member (not shown) that is protruded inward from the case 11.

The stud 13 is connected by the cylindrical elastic body 16 with a cylindrical case 12 at a concentric position to each other, and by inserting the elastic body 16 into the case 11, the stud 13 is held at the position of an axis of the case 11 via the elastic body 16. The cylindrical case 12 has a cylindrical portion 12a having a smaller diameter than the inner diameter of the case 11, and a mounting plate 12c provided with a mounting hole 12b. The mounting hole 11b of the mounting plate 11d of the case 11 and the mounting hole 12b of the mounting plate 12c of the cylindrical case 12 are in positional relationship in which they correspond to each other when the elastic body 16 is inserted into the case 11 to be installed.

The cylindrical elastic body 16 is molded of rubber, resin or the like, has a predetermined recessed portion 16a on an undersurface thereof, and is inserted in the case 11 by pressing the damping plate 15 against the step 11e of the case 11. In the first embodiment, the recessed portion 16a is formed in a ring form in a circumferential direction, but this is not restrictive, and a plurality of (for example, two) recessed portions may be provided separately at the positions opposing each other with, for example, the stud 13 between them, or the recessed portions may be provided at the positions with different radiuses. The fixing claw 11c of the case 11 is folded and caulked so as to wrap a side surface of the fixing plate 12c of the cylindrical case 12, whereby the cylindrical case 12 is fixed to the case 11 and placement of the elastic body 16 is completed.

Inside the case 11 sealed by the elastic body 16, a viscous liquid L such as silicone oil is sealed up to a midpoint of the recessed portion 16a of the elastic body 16, and an air chamber hermetically sealed by the viscous liquid L is formed at an upper part inside the recessed portion 16a. A hole for injecting the viscous liquid L is provided in the bottom face of the case 11, and the hole is closed by a plug body 58. According to the above-described constitution, an inside of the case 11 is divided into an A chamber 19a, a B chamber 19b, and a C chamber 19c from the lower position by the damping member 14 and the damping plate 15. The A chamber 19a and the B chamber 19b communicate with each other via the ring clearance H1, while the B chamber 19b and the C chamber 19c communicate with each other via the ring clearance H2. The C chamber 19c includes the aforementioned air chamber.

When a mount-placed apparatus such as a cab is moved downward by vibrations and impacts occurring to the vehicle, the stud 13 is pressed downward, and the A chamber 19a at the lower side from the damping member 14 is at high pressure and has a large pressure difference from the B chamber 19b, whereby the viscous liquid L passes through the ring clearance H1 and flows into the B chamber 19b. Here, the mount-placed apparatus means an apparatus on which the liquid-sealed mount of the present invention is placed. A pressure difference also occurs on both sides of the damping plate 15, air inside the C chamber 19c is compressed following the movement of the stud 13, and the viscous liquid L passes through the ring clearance H2 and also flows into the C chamber 19c. A large damping force can be obtained by pressure loss, which is caused at the time when the viscous liquid L is throttled and flows in the ring clearances H1 and H2. In this situation, accuracy of the clearance H2 is secured, and therefore a stable and large damping force by the clearance H2 can be obtained.

Figure 10:
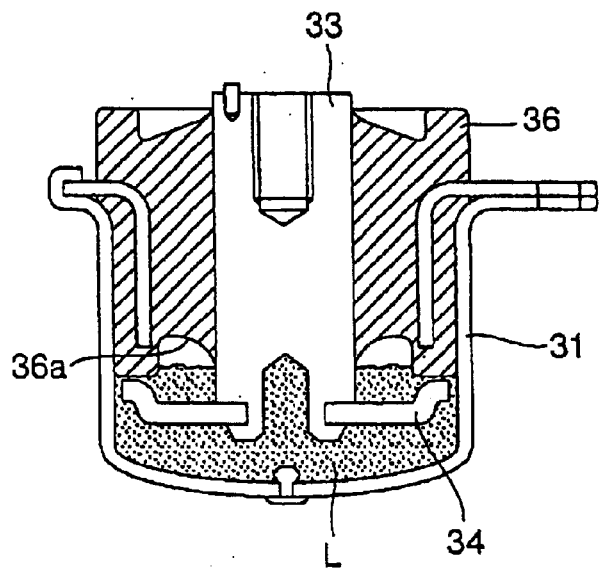
FIG. 10 is a sectional view of a first example of a liquid-sealed mount of a prior art.

When the mount-placed apparatus such as a cab is moved upward, the stud 13 is pressed upward, and since the B chamber 19b at an upper side from the damping member 14 is provided with the damping plate 15 at a top portion, the B chamber 19b can be at high pressure unlike the case in FIG. 10. As a result, the B chamber 19b has a large pressure difference from the A chamber 19a, and the viscous liquid L passes through the ring clearance H1 and flows into the A chamber 19a. A pressure difference also occurs on both sides of the damping plate 15, and the viscous liquid L passes through the ring clearance H2 and also flows into the B chamber 19b from the C chamber 19c. A large damping force can be obtained by the resistance caused when the viscous liquid L flows through the ring clearances H1 and H2.

Further, when a large load in the descending direction acts on the stud 13, the B chamber 19b can be made to be at high pressure, and even if the pressure difference from the A chamber 19a is increased correspondingly to the load, the pressure inside the A chamber 19a is not reduced to the extent in which cavitation occurs in the A chamber 19a. As a result, occurrence of cavitation can be prevented, and by securing the flow of the viscous liquid L in the ring clearances H1 and H2, a large damping force can be obtained.

Consequently, the pressure difference between the upper and lower side from the damping member 14 can be made large when the stud 13 ascends as when it descends, and therefore a favorable damping force can be obtained for both the upward and downward directions, and the damping force with the damping plate 15 can be obtained. In this situation, the accuracy of the clearance H2 is similarly secured, a stable and large damping force by the clearance H2 can be obtained.

When a lateral impact is applied to the stud 13, the elastic body 16 can cushion it. The damping plate 15 has a function of a stopper for the ascending direction, and receives the damping member 14. On this occasion, the damping plate 15, which is pressed against the step 11c by the elastic body 16, deforms the elastic body 16 and is slidable upward, and therefore collision of the damping member 14 against the damping plate 15 can be cushioned by the elastic body 16.

Figure 2A:
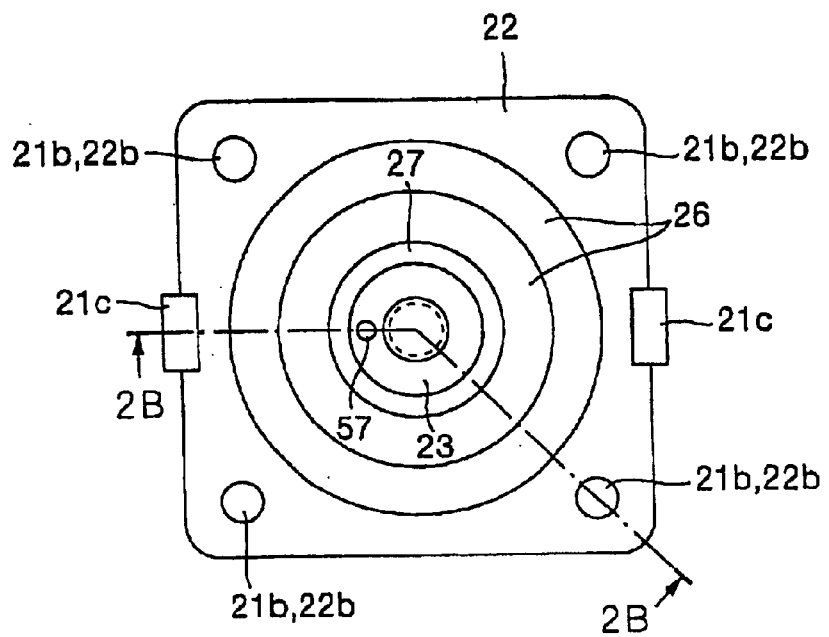
FIG. 2A is a plan view showing a second embodiment of the present invention.
Figure 2B:
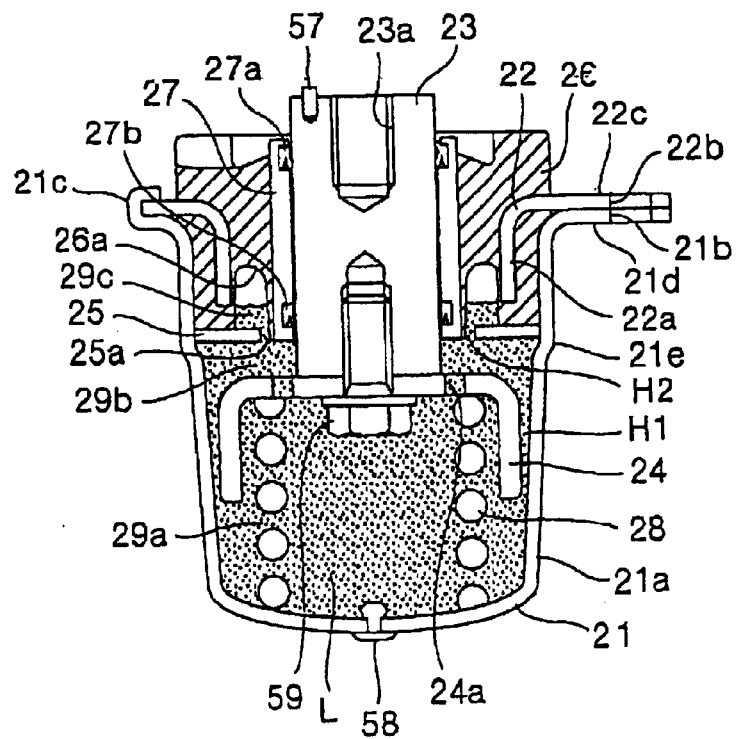
FIG. 2B is a sectional view taken along the line 2B—2B in FIG. 2A.

Next, a second embodiment will be explained based on FIG. 2A and FIG. 2B. FIG. 2A is a plan view of a liquid-sealed mount and FIG. 2B is a sectional view taken along the line 2B—2B. A case 21 has a cup portion 21a, and a mounting plate 21d provided with a mounting hole 21b and a fixing claw 21c. A step 21e is provided at a slightly upper position in a middle portion of the cup portion 21a, an inner diameter of the case 21 at a lower part from the step 21e is a little smaller, and the inner diameter gradually becomes smaller toward a tip thereof.

A damping member 24 fixed to a lower end of a stud 23 by means of a bolt 59 is housed inside the case 21. The damping member 24 is in a cup shape having a little smaller diameter than the inner diameter of the case in the lower part from the step 21e, is fixed with a bottom face up, and a ring-shaped clearance H1 is formed between an outer circumferential portion thereof and the case 21. A small hole 24a is provided in the bottom face to release air remaining below the damping member 24 upward after a viscous liquid that will be described later is sealed. A coil spring 28 is provided between the case 21 and the damping member 24. The cup-shaped damping member 24 also has the function as a retainer for preventing lateral displacement of the coil spring 28.

The stud 23 is in a circular cylinder shape having a screw hole 23a in a center of an upper end portion, and a pin 57 for preventing turning is attached at a top end portion. Surface treatment such as molybdenum disulfide baking and hard chrome plating, or surface treatment to improve lubricity such as manganese phosphate coating treatment is applied to an outer circumferential surface of the stud 23.

A sleeve 27 is in a cylindrical shape, constructed by a material of copper, lead, or the like with good lubricity, or a material made by applying surface treatment such as manganese phosphate treatment to a carbon steel pipe or the like, has an inner diameter that is hermetically in contact with the stud 23, and holds the stud 23 to be axially slidable. The sleeve 27 has grooves in a circumferential direction in an inner face of an upper end portion and a lower end portion, and a scraper 27a is attached in the upper groove while an oil seal 27b is attached in the lower groove. The sleeve 27 is connected by a cylindrical elastic body 26 with the cylindrical case 22 at a concentric position to each other, and the sleeve 27 is held at an axis position of the case 21 via the elastic body 26 so that a lower end of the sleeve 27 is in the vicinity of the step 21c by inserting the elastic body 26 into the case 21. As a result, the stud 23 is also held at the axis position of the case 21 via the elastic body 26 and the sleeve 27.

The cylindrical case 22 has a cylindrical portion 22a having a smaller diameter than the inner diameter of the case 21, and a mounting plate 22c provided with a mounting hole 22b. The mounting hole 21b of the mounting plate 21d of the case 21 and the mounting hole 22b of the mounting plate 22c of the cylindrical case 22 are in the positional relationship in which they correspond to each other when the elastic body 26 is inserted into the case 21 to be installed.

The cylindrical elastic body 26 is molded of rubber, resin or the like has a recessed portion 26a in a circumferential direction on an undersurface thereof. In the second embodiment, the recessed portion 26a is formed in a ring shape in the circumferential direction, but this is not restrictive, and a plurality of (for example, two) recessed portions may be provided separately at the positions opposing with, for example, the stud 23 between them, or the recessed portions may be provided at the positions with different radiuses. The elastic body 26 wraps the sleeve 27 to connect to it so that the lower end of the sleeve 27 slightly projects downward from the outer circumferential portion of an undersurface of the elastic body 26, and the elastic body 26 presses a damping plate 25 against the step 21c of the case 21 to be inserted in the case 21. The fixing claw 21c of the case 21 is folded and caulked so as to wrap a side face of the fixing plate 22c of the cylindrical case 22, whereby the cylindrical case 22 is fixed to the case 21 and placement of the elastic body 26 is completed.

The damping plate 25 is formed to be a ring shape as a whole, and is constructed integrally, or by a plurality of separate components. Other than the constitution in which the damping plate 25 is attached to the step 21e portion as described above, the damping plate 25 may be attached to, for example, a pin that is protruded inward from the case 21, a protruding member (not shown), or the aforementioned tapered portion (the region in which the inner diameter gradually becomes smaller toward the lower position) of the inner face of the case 21.

The damping plate 25 attached to the step 21e portion of the case 21 forms a disc shape having substantially the same outer diameter as the inner diameter of the case 21 at an upper position than the step 21e, a hole 25a, which has a little larger diameter than an outer diameter of the elastic body 26 wrapping the lower end portion of the sleeve 27, is provided at a center thereof, and a ring-shaped clearance H2 is formed in a space from the elastic body 26 at the lower end portion of the sleeve 27. Here, the dimensional accuracy of the outer diameter of the sleeve 27 and the diameter of the hole 25a of the damping plate 25 is secured when the materials are worked, and an amount of lateral elastic deformation of the elastic body 26 is not so large, so that a clearance H2 with the dimensional accuracy being maintained and with stable quality is formed.

Inside the case 21 sealed by the elastic body 26, a viscous liquid L such as silicone oil is sealed up to a midpoint of the recessed portion 26a of the elastic body 26, and an air chamber hermetically sealed by the viscous liquid L is formed at an upper part inside the recessed portion 26a. A hole for injecting the viscous liquid L is provided in the bottom face of the case 21, and the hole is closed by a plug body 58.

According to the above-described constitution, an inside of the case 21 is divided into an A chamber 29a, a B chamber 29b, and a C chamber 29c from the lower position by the damping member 24 and the damping plate 25. The A chamber 29a and the B chamber 29b communicate with each other via the ring clearance H1 and the small hole 24a, while the B chamber 29b and the C chamber 29c communicate with each other via the ring clearance H2. The C chamber 29c includes the aforementioned air chamber.

In the second embodiment, the constitution is such that the damping plate 25 attached to the case 21 is provided above the damping member 24 attached to the stud 23, and the inside of the case 21 is divided into the A chamber 29a, the B chamber 29b and the C chamber 29c by the damping member 24 and the damping plate 25, thus making it possible to obtain a favorable damping force for both upward and downward directions according to the same operation as in the first embodiment. In this situation, the accuracy of the clearance H2 is similarly secured, and therefore a stable large damping force by the clearance H2 can be obtained.

Figure 11:
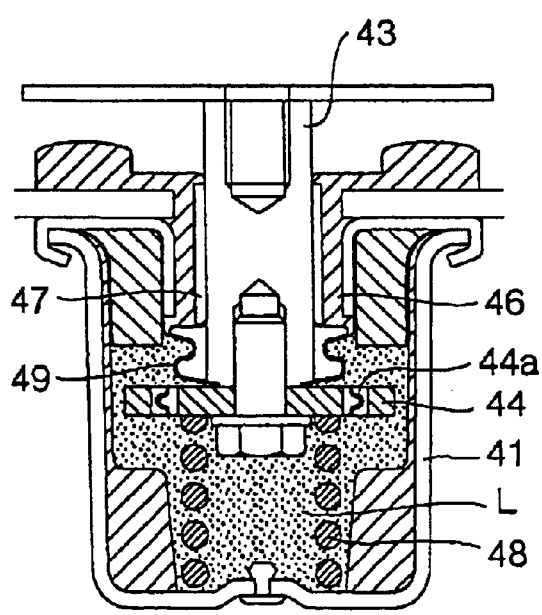
FIG. 11 is a sectional view of a second example of the liquid-sealed mount of the prior art.

Since the stud 23 is slidably held by the sleeve 27, the stud 23 is supported by the coil spring 28 even if a large load acts on the stud 23, and breakage of the elastic body 26 can be prevented. The bellows explained in the prior art of FIG. 11 is complicated in production and has a possibility of breakage. On the other hand, in the second embodiment, the stud 23 with the surface treatment having good lubricity being applied, and the sleeve 27 having the scraper 27a and the oil seal 27b in its inner face and constructed by a material with good lubricity are combined, and therefore reliability and durability are excellent at low cost, thus making it possible to surely prevent leakage of the viscous liquid L.

Further, since the inner diameter of the case 21 at the lower part from the step 21e gradually decreases, the ring clearance H1 is gradually narrowed and the damping force increases smoothly as the stud 23 descends and the damping member 24 descends. As a result, the impact at the stroke end can be prevented. In addition, since the inner diameter of the case 21 in the lower part from the step 21c gradually decreases and the ring clearance H1 between the damping member 24 and the case 21 is narrower at the lower end side of the damping member 24 than at the upper end side, a reaction force received from the case 21 gradually increases at the lower end side. Consequently, a resultant force of the reaction forces to control a lateral vibration acts on the lower portion of the damping member 24 for the lateral vibration (rotation moment) which causes the upper end portion of the stud 23 to swing, and therefore a large vibration control effect can be obtained.

Since the stud 23 is slidable in the axial direction via the sleeve 27, the stud 23 never pulls the elastic body 26 downward when the stud 23 descends, and therefore a volumetric capacity of the air chamber, which is formed in the recessed portion on the undersurface of the elastic body 26, is maintained, which makes the viscous liquid L easily flow into the C chamber 29c including the air chamber from the B chamber 29b. Accordingly, a large damping force can be obtained due to the pressure loss in this inflow.

In the second embodiment, explanation is made with the example in which both the surface treatment to improve lubricity of the stud 23 and constructing the sleeve 27 of the material with excellent lubricity are carried out, but with the example in which only one of them is carried out, the same effect can be obtained. The shape of the damping material 24 is not limited to a cup shape, but, for example, a columnar shape, or a shape of a letter H in section with open recesses on a top and a bottom may be suitable, and with these shapes, the same damping effect and swing vibration control effect as described above can be obtained.

Figure 3:
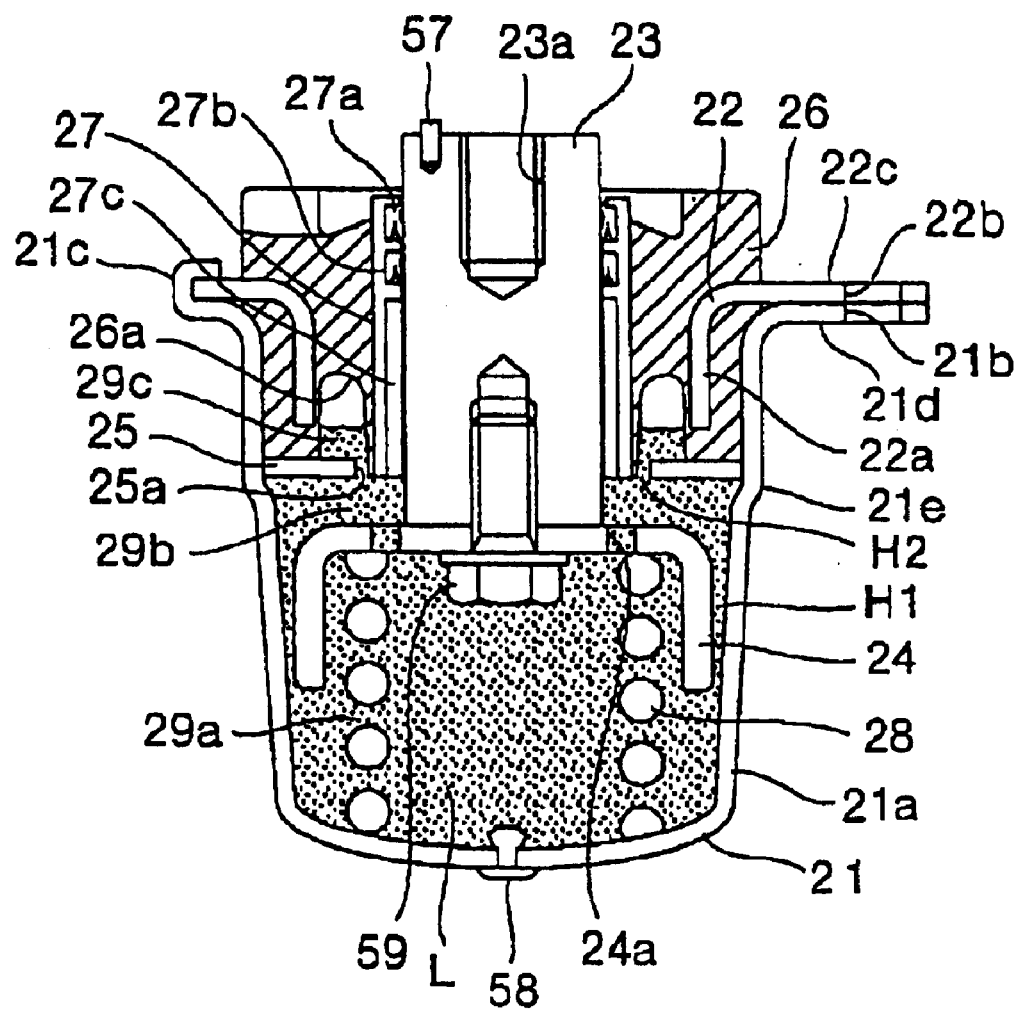
FIG. 3 is a sectional side view showing another mode of the second embodiment of the present invention.

As shown in FIG. 3, the constitution in which a dry bearing 27c such as a DU bush is inserted in the sleeve 27 may be suitable. In this situation, it is preferable to apply hard chrome plating treatment to a stud 24. Further, the placement positions of the scraper 27a and the oil seal 27b are not limited to the positions explained in the above-described embodiment, but it may be suitable to provide them side by side with each other in the vicinity of the upper end portion of the sleeve 27 as shown in FIG. 3, for example.

Figure 4A:
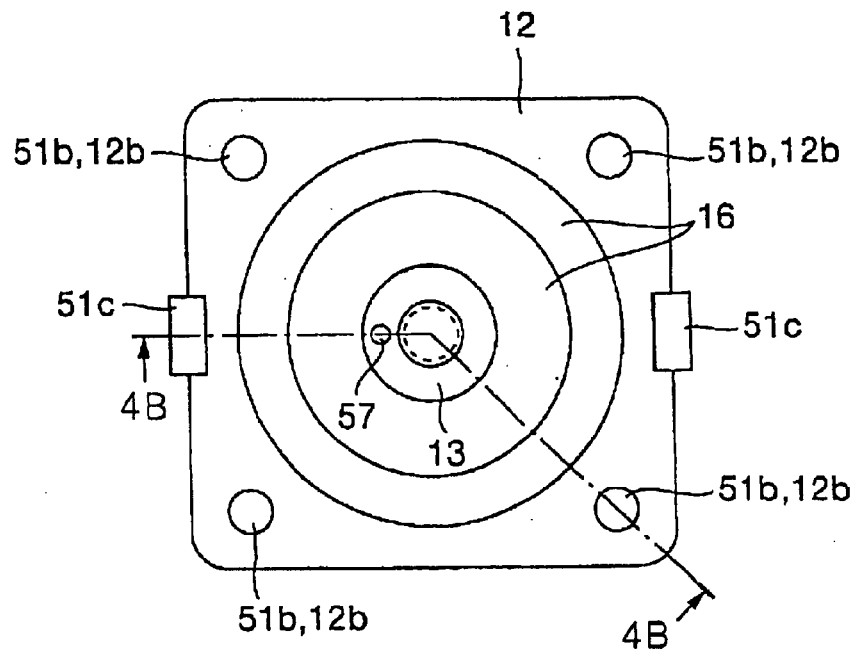
FIG. 4A is a plan view showing a third embodiment of the present invention.
Figure 4B:
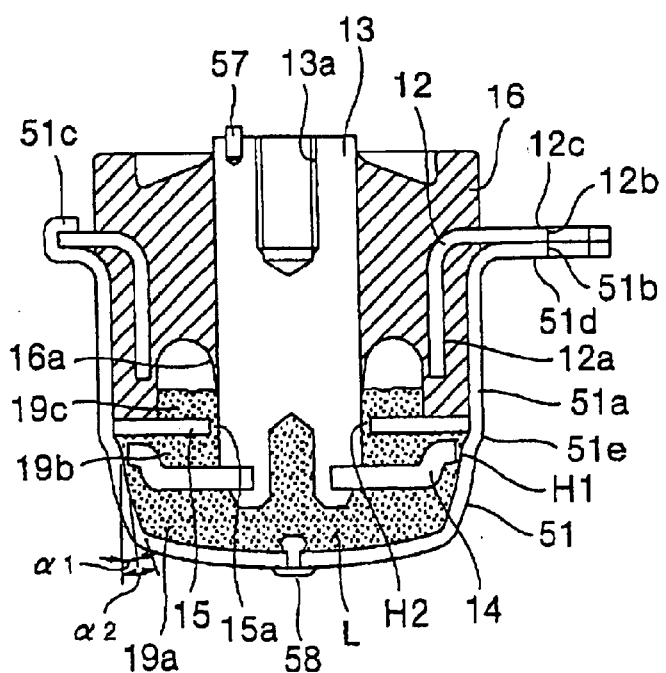
FIG. 4B is a sectional view taken along the line 4B—4B in FIG. 4A.

Next, a third embodiment will be explained based on FIG. 4A and FIG. 4B. FIG. 4A is a plan view of a liquid-sealed mount, and FIG. 4B is a sectional view taken along the line 4B—4B. The same components as the components in FIG.

1A and FIG. 1B are given the same reference numerals and symbols. A case 51 has a cup portion 51a and a mounting plate 51d provided with a mounting hole 51b and a fixing claw 51c. A step 51e is provided at a slightly lower position of a middle portion of the cup portion 51a, and an inner diameter of the case 51 in a lower part from the step 51e becomes slightly smaller. Further, the case 51 in the lower part from the step 51e is in a tapered shape with the inner diameter gradually decreasing toward a lower position, which is inclined at an angle of inclination $\alpha 1$ up to a position with a predetermined height, and is inclined at an angle of inclination $\alpha 2$ (note that $\alpha 1 < \alpha 2$) in a lower part from here.

A damping member 14 fixed to a lower end of a stud 13 by means of caulking or the like is housed inside the case 51. The damping member 14 is in a circular shape having a little larger diameter than the inner diameter of the case at the lower end portion of the tapered portion at the angle of inclination $\alpha 2$, and forms a ring-shaped clearance H1 between a circumferential portion thereof and the case 51. The stud 13 is in a cylindrical shape having a screw hole 13a at a center of an upper end portion thereof, and a pin 57 for preventing turning is attached at a top end portion. A damping plate 15 is attached to the step 51e portion of the case 51. The damping plate 15 is in a disc shape having an outer diameter substantially the same as the inner diameter of the case 51 in an upper part from the step 51e, with a hole 15a having a slightly larger diameter than the outer diameter of the stud 13 being provided in its center, and forms a ring clearance H2 in a space from the stud 13.

The stud 13 is connected by a cylindrical elastic body 16 with a cylindrical case 12 at a concentric position to each other, and is held at a position of an axis of the case 51 via the elastic body 16 by inserting the elastic body 16 into the case 51. The cylindrical case 12 has a cylindrical portion 12a having a smaller diameter than the inner diameter of the case 51, and the mounting plate 12c provided with the mounting hole 12b. The mounting hole 51b of the mounting plate 51d of the case 51 and the mounting hole 12b of the mounting plate 12c of the cylindrical case 12 are in the positional relationship in which they are corresponding to each other when the elastic body 16 is inserted into the case 51 to be installed.

The cylindrical elastic body 16 is molded of rubber, resin or the like, has a recessed portion 16a in a circumferential direction on an undersurface, and it is inserted into the case 51 by pressing the damping plate 15 against the step 51e of the case 51. Then, the fixing claw 51c of the case 51 is folded and caulked to wrap a side face of the fixing plate 12c of the cylindrical case 12, whereby the cylindrical case 12 is fixed to the case 51 to complete placement of the elastic body 16. Inside the case 51 sealed by the elastic body 16, a viscous liquid L such as silicone oil is sealed up to a midpoint of the recessed portion 16a of the elastic body 16, and an air chamber sealed by the viscous liquid L is formed in an upper part inside the recessed portion 16a. A hole for injecting the viscous liquid L is provided in the bottom face of the case 51, and is closed by a plug body 58.

According to the above-described constitution, the inside of the case 51 is divided into an A chamber 19a, a B chamber 19b, and a C chamber 19c from the bower position by the damping member 14 and the damping plate 15. The A chamber 19a and the B chamber 19b communicate with each other via the ring clearance H1, and the B chamber 19b and the C chamber 19c communicate with each other via the ring clearance H2. The C chamber 19c includes the aforementioned air chamber.

When a mount-placed apparatus such as a cab is moved downward by vibrations and impacts occurring to the vehicle, the stud 13 is pressed downward, the A chamber 19a at the lower side of the damping member 14 is at high pressure with a pressure difference from the B chamber 19b being increased, and the viscous liquid L passes through the ring clearance H1 and flows into the B chamber 19b. The pressure difference also occurs on both sides of the damping plate 15, the air in the C chamber 19c is compressed following the movement of the stud 13, and the viscous liquid L passes through the ring clearance H2 and also flows into the C chamber 19c. A large damping force can be obtained by the pressure loss at the time when the viscous liquid L is throttled and flows in the ring clearances H1 and H2.

Figure 5:
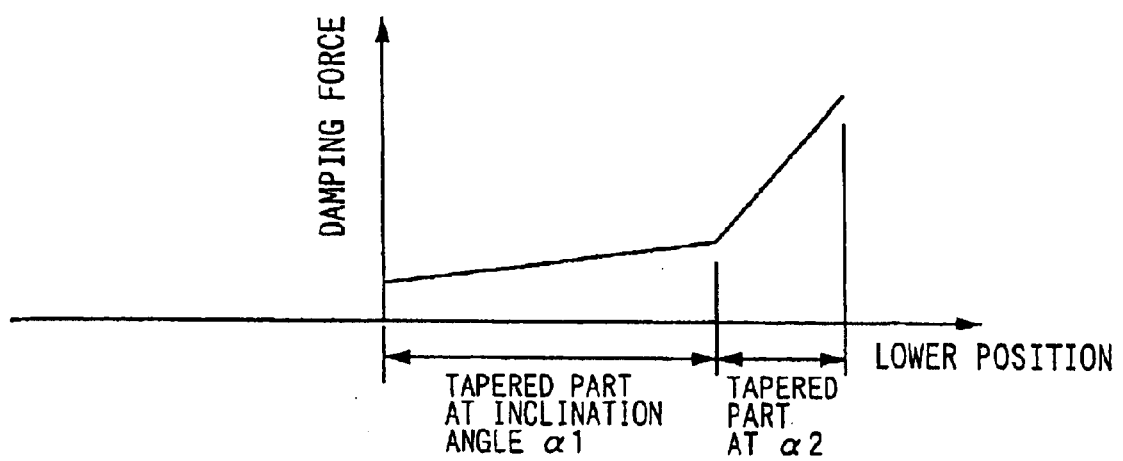
FIG. 5 is an explanatory view of an operation of a case in a tapered shape according to the present invention.

In this situation, the case 51 is in a tapered shape toward a lower position, and in the third embodiment, the case 51 has an angle of inclination gradually decreasing in two stages. Consequently, the ring clearance H1 at the outer circumferential portion of the damping member 14 is decreased in the two stages, following the downward movement of the stud 13, and therefore a damping force caused by pressure loss in the ring clearance H1 is gradually increased in the two stages as shown in FIG. 5. Namely, the damping force can be increased in accordance with the amplitude of a vibration, and the damping force is further made larger before abutment against the stopper to cushion the impact (for example, a sense of hitting with a thump) at the time of abutting against the stopper. Here, "abut against the stopper" means the case in which an undersurface portion of the damping member 14 abuts against a bottom face of the case 51.

It is suitable if only the case 51 has the inner diameter gradually decreasing toward the lower position and forms a tapered shape with different angles of inclination on the upper and lower part, and it goes without saying that it may be a tapered shape of a curved surface with different angles of inclination in the upper and lower part.

When the mount-placed apparatus such as the cab moves upward, the stud 13 is pulled upward, and since the damping plate 15 is provided above the B chamber 19b on the upper side of the damping member 14, the B chamber 19b can be at high pressure unlike the case in FIG. 10. As a result, the B chamber 19b has a large pressure difference from the A chamber 19a, and the viscous liquid L passes through the ring clearance H1 and flows into the A chamber 19a. A pressure difference also occurs on both sides of the damping plate 15, and the viscous liquid L passes through the ring clearance H2 and flows into the B chamber 19b from the C chamber 19c. A large damping force can be obtained by the pressure loss caused when the viscous liquid L passes through the ring clearances H1 and H2.

Further, even when a large load in the descending direction acts on the stud 13, the B chamber 19b can be made to be at high pressure, and therefore even if the pressure in the A chamber 19a reduces more than the B chamber 19b corresponding to the load, the pressure inside the A chamber 19a is not reduced to an extent to cause cavitation in the A chamber 19a. Thus, occurrence of cavitaion can be prevented, and therefore a large damping force can be obtained by securing the flow of the viscous liquid L in the ring clearances H1 and H2.

As a result, when the stud 13 ascends as when the stud 13 descends, the pressure difference between the upper and lower sides of the damping member 14 can be made large, and therefore a favorable damping force can be obtained for both the upward and downward directions, and a damping force in the damping plate 15 can be obtained. When a lateral impact is applied to the stud 13, it is cushioned by the elastic body 16. For the ascending direction, the damping plate 15 has a function of a stopper, and receives the damping member 14. On this occasion, the damping plate 15, which is pressed against the step 51e by the elastic body 16, deforms the elastic body 16 to be slideable upward, and therefore collision of the damping member 14 against the damping plate 15 can be cushioned by the elastic body 16. Thus, even if the damping member 14 and the damping plate 15 are both made of metal, and even if a collision cushioning elastic body is not specially provided, the above-described collision can be cushioned.

Figure 6A:
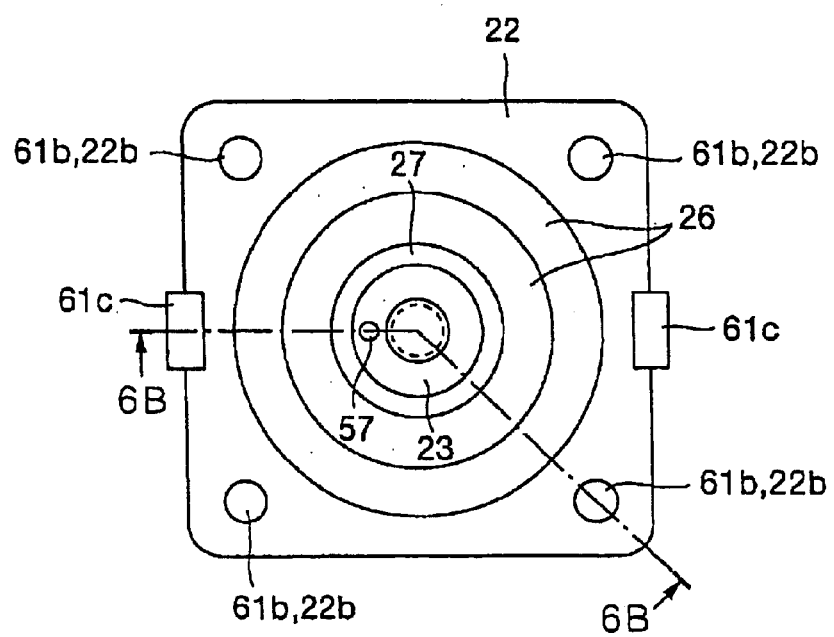
FIG. 6A is a plan view showing a fourth embodiment of the present invention.
Figure 6B:
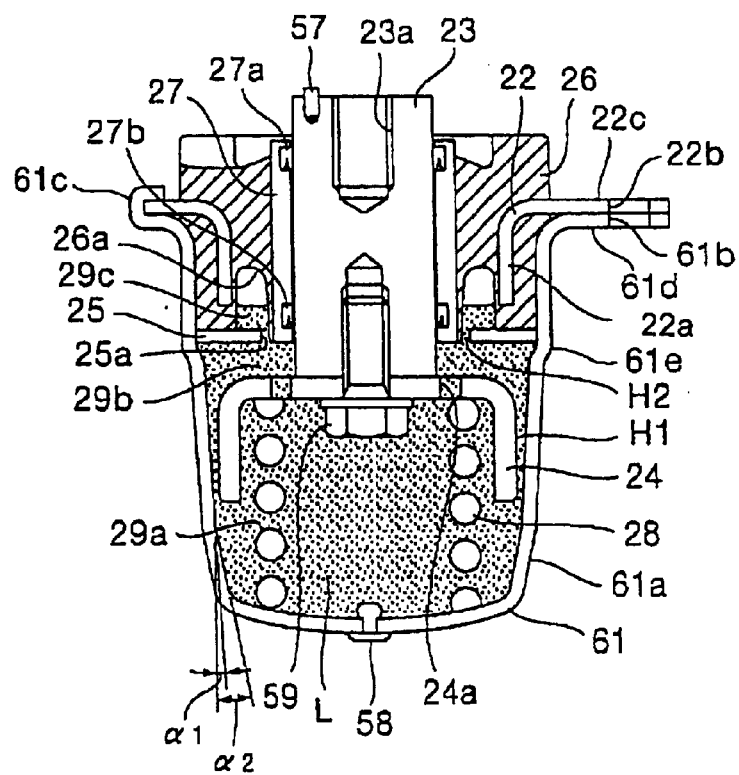
FIG. 6B is a sectional view taken along the line 6B—6B in FIG. 6A.

Next, a fourth embodiment will be explained based on FIG. 6A and FIG. 6B. FIG. 6A is a plan view of a liquid-sealed mount, and FIG. 6B is a sectional view taken along the line 6B—6B. The same components as those in FIG. 2A and FIG. 2B are given the same reference numerals and symbols. A case 61 has a cup portion 61a, and a mounting plate 61d provided with a mounting hole 61b and a fixing claw 61c. A step 61e is provided at a slightly upper position of a middle portion of the cup portion 61a, and an inner diameter of the case 61 in a lower part from the step 61e becomes a little smaller. Further, the inner diameter of the case 61 in the lower part from the step 61e forms a tapered shape which gradually becomes smaller toward a bottom, which inclines at an angle of inclination $\alpha 1$ up to a middle position with a predetermined height and inclines at an angle of inclination of $\alpha 2$ (note that $\alpha 1 < \alpha 2$) in the lower part from the middle position.

A damping member 24 fixed to a lower end of a stud 23 with a bolt 59 is housed inside the case 61. The damping member 24 is in a cup shape opened downward, which has a slightly larger diameter than the case inner diameter at the lower end portion of the tapered portion at the angle of inclination $\alpha 2$, and is fixed with a bottom face up. An outer circumferential side surface of the damping member 24 is formed to be substantially parallel with an axis direction of the stud 23 (namely, in the direction of vertical motion), and a ring-shaped clearance H1 is formed between the outer circumferential side surface and the case 61. A small hole 24a is provided in a bottom face of the damping member 24 so as to release the air remaining inside the cup shape of the damping member 24 upward after the viscous liquid that will be described later is sealed. A coil spring 28 is provided between the case 61 and the damping member 24. The cup-shaped damping member 24 also has a function as a retainer to prevent lateral displacement of the coil spring 28.

The stud 23 is in a circular cylinder shape having a screw hole 23a in a center of an upper end portion, and a pin 57 for preventing turning is attached at a top end portion. Surface treatment to improve lubricity such as molybdenum disulfide baking or manganese phosphate coating formation is applied to an outer circumferential surface of the stud 23.

A sleeve 27 is in a cylindrical shape, constructed by a material with favorable lubricity such as copper and lead, has an inner diameter hermetically in contact with the stud 23, and holds the stud 23 slidably in an axial direction. The sleeve 27 has grooves in the circumferential direction on inner surfaces of an upper end portion and a lower end portion, and a scraper 27a is attached in the upper groove while an oil seal 27b is attached in the lower groove. The sleeve 27 is connected by the cylindrical elastic body 26 at a concentric position to each other with a cylindrical case 22, and by inserting the elastic body 26 into the case 61, it is held at a position of an axis of the case 61 via the elastic body 26 so that a lower end of the sleeve 27 is in the vicinity of the step 61e. Thus, the stud 23 is also held at the position of the axis of the case 61 via the elastic body 26 and the sleeve 27.

The cylindrical case 22 has a cylindrical portion 22a having a smaller diameter than the inner diameter of the case 61, and a mounting plate 22c provided with a mounting hole 22b. The mounting hole 61b of the mounting plate 61d of the case 61 and the mounting hole 22b of the mounting plate 22c of the cylindrical case 22 are in the positional relationship in which they correspond to each other when the elastic body 26 is inserted into the case 61 to be installed therein.

The cylindrical elastic body 26 is molded of rubber, resin or the like, and has a recessed portion 26a in the circumferential direction on the undersurface thereof. The cylindrical elastic body 26 wraps the sleeve 27 to connect to it so that a lower end of the sleeve 27 projects a little downward from the outer circumferential portion of the underside surface, and it presses the damping plate 25 against the step 61e of the case 61 to be inserted in the case 61. The fixing claw 61c of the case 61 is folded to be caulked to wrap the side surface of the mounting plate 22c of the cylindrical case 22, whereby the cylindrical case 22 is fixed to the case 61 to complete placement of the elastic body 26.

The damping plate 25 attached to the step 61e portion of the case 61 is in a disc shape having an outer diameter substantially the same as the inner diameter of the case 61, and is provided with a hole 25a with a slightly larger diameter than an outer diameter of the elastic body 26 wrapping the lower end portion of the sleeve 27 in a center thereof, and a ring-shaped clearance H2 is formed in a space from the elastic body 26 of the lower end portion of the sleeve 27. Inside the case 61 sealed by the elastic body 26, a viscous liquid L such as silicone oil is sealed up to a midpoint in the recessed portion 26a of the elastic body 26, and an air chamber sealed by the viscous liquid L is formed at an upper part inside the recessed portion 26a. A hole for injecting the viscous liquid L is provided in the bottom face of the case 61, and is closed by a plug body 58.

According to the above-described constitution, the inside of the case 61 is divided into an A chamber 29a, a B chamber 29b and a C chamber 29c from the lower position by the damping member 24 and the damping plate 25. The A chamber 29a and the B chamber 29b communicate with each other via the ring clearance H1 and the small hole 24a, and the B chamber 29b and the C chamber 29c communicate with each other via the ring clearance H2. The C chamber 29c includes the aforementioned air chamber.

In the forth embodiment, the damping plate 25 attached to the case 61 is provided above the damping member 24 attached to the stud 23 to make the constitution in which the inside of the case 61 is divided into the A chamber 29a, the B chamber 29b and the C chamber 29c by the damping member 24 and the damping plate 25. Consequently, according to the same operation as in the first embodiment, the inside of the B chamber 29b can be made high pressure at the time when the damping member 24 moves upward, and a favorable damping force can be obtained for both the upward and the downward directions.

In the fourth embodiment as in the second embodiment, the stud 23 is slidably held by the sleeve 27, and therefore even if a large load acts on the stud 23, the stud 23 is supported by the coil spring 28, thus making it possible to prevent breakage of the elastic body 26. By combination of the stud 23 with the surface treatment having good lubricity being applied and the sleeve 27 constructed by a material with good lubricity, leakage of the viscous liquid L can be surely prevented at low cost with excellent reliability and durability.

Further, the case 61 in the lower part from the step 61e is in a tapered shape in which the inner diameter gradually becomes smaller toward the lower part of the case 61 with inclinations of two stages, and therefore, the ring clearance H1 is gradually narrowed in two stages as the stud 23 descends and the damping member 24 descends as what is shown in FIG. 5, thus making it possible to obtain a damping force gradually increasing in two stages. As a result, an impact at a stroke end (namely, at the time of abutting against the stopper) can be prevented.

Figure 7:
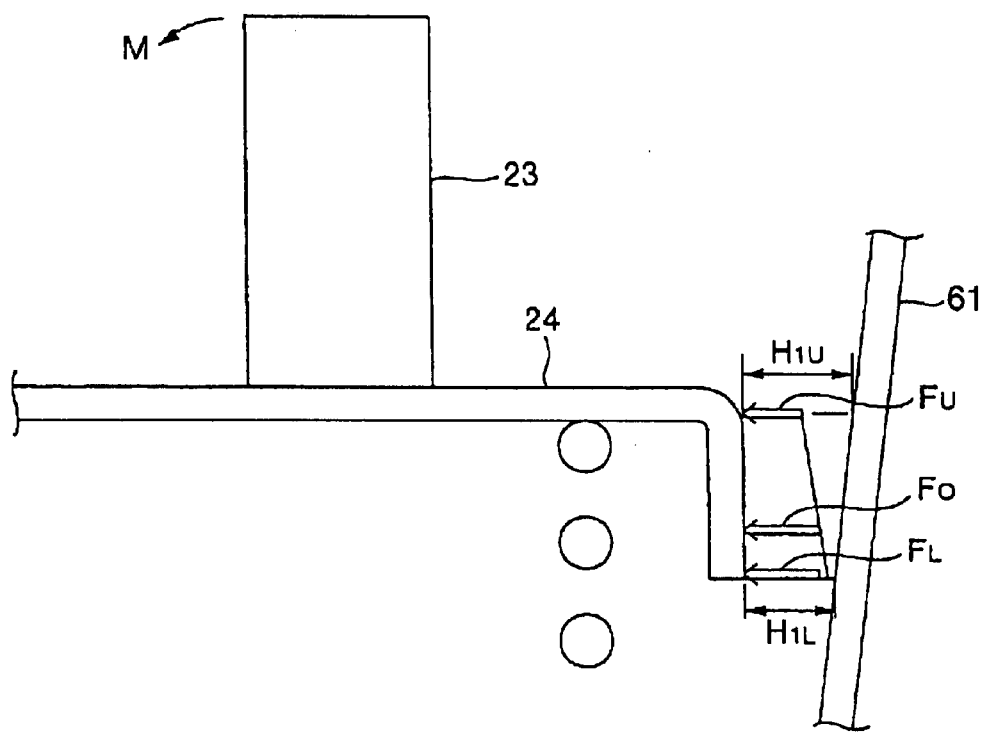
FIG. 7 is an explanatory view of an operation of a clearance of the fourth embodiment of the present invention.

In the fourth embodiment, the inner diameter of the case 61 is formed to be gradually smaller, and the ring clearance H1 between the outer circumferential side surface of the damping member 24 and the case 61 is made narrower in the upper part than in the lower part, so that the resultant force of the reaction forces acting on the outer circumferential side surface of the damping member 24 occurs to the lower part. Namely, as shown in FIG. 7, a clearance H1L at the lower end portion of the damping member 24 is narrower than a clearance H1U at the upper end portion, and therefore as for the reaction force received from the case 61 via the viscous liquid L when the outer circumferential side surface of the damping member 24 approaches the case 61, a reaction force FL at the lower end portion is the largest, and a reaction force FU at the upper end portion is the smallest. As a result, a point of action of a resultant force FO of the reaction forces acting on the outer circumferential side surface of the damping member 24 is at the position lower than the center portion in the height direction of the outer circumferential side surface. Accordingly, when a lateral vibration, which causes the stud 23 to swing, occurs to the upper end portion of the stud 23, for example, and a rotation moment M acts on the upper end portion, such moment as brings the damping member 24 close to the case 61 occurs, but the resultant force FO of the reaction forces received from the case 61 act on the lower position of the outer circumferential side surface of the damping member 24, and therefore the effect of controlling the rotation moment to damp the aforementioned swing vibration is increased, thus making it possible to effectively control the vibration of the stud 23.

Since the stud 23 is slidable in the axial direction via the sleeve 27, the stud 23 does not pull the elastic body 26 when the stud 23 is lowered, and therefore the volumetric capacity of the air chamber formed in the recessed portion of the undersurface of the elastic body 26 is maintained to make it easy for the viscous liquid to flow into the air chamber. Accordingly, a large damping force can be obtained by the pressure loss in this inflow.

In the forth embodiment, the case 61 is suitable if only it gradually reduces in the inner diameter toward the lower side thereof, and forms the taper shape with the angles of inclination differing in the upper and the lower parts, and it goes without saying that the case 61 may be in a taper shape with a curved surface in which the angles of inclination differ in the upper and lower parts.

Figure 8A:
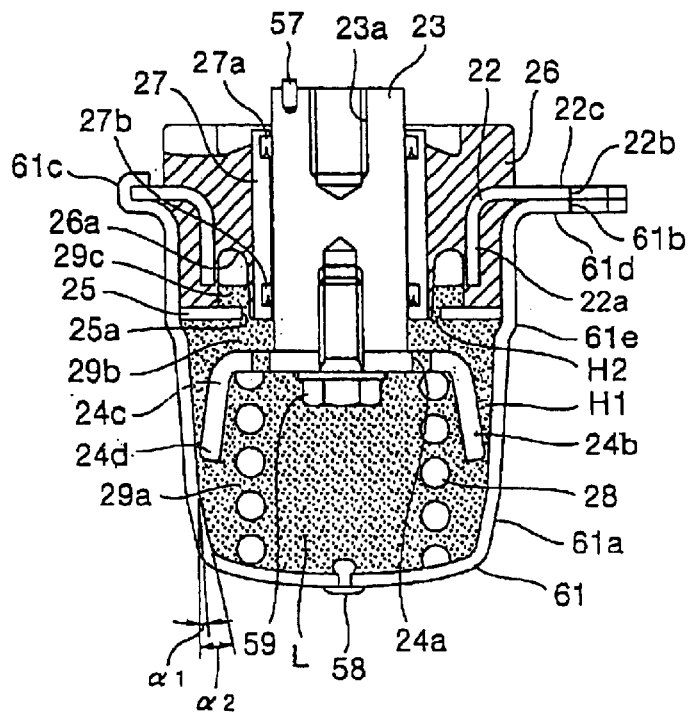
FIG. 8A is a sectional side view showing another mode of the fourth embodiment of the present invention.
Figure 8B:
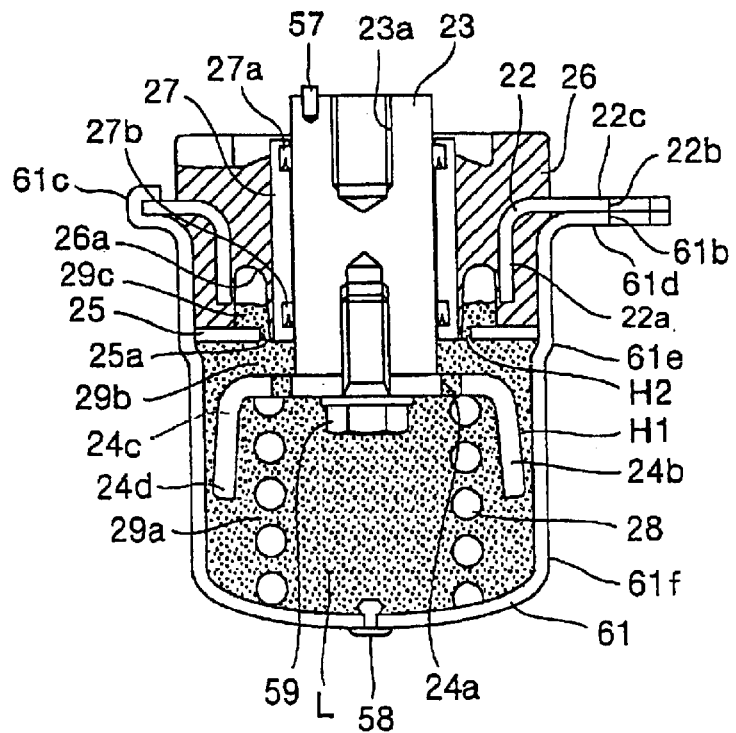
FIG. 8B is a sectional side view showing still another mode of the fourth embodiment of the present invention.

In the forth embodiment, as the constitution in which the ring clearance H1 between the outer circumferential side surface of the damping member 24 and the case 61 is made narrower in the upper part than in the lower part, the inner face of the case 61 is formed in a tapered shape in which the diameter becomes smaller toward the lower position, and the outer circumferential side surface of the damping member 24 is formed in the shape substantially parallel to the axial direction of the stud 23 to obtain the effect of controlling the vibration to cause the stud 23 to swing. However, this is not restrictive, and for example, as shown in FIG. 8A, the outer diameter of the damping member 24b may be formed to be larger in the lower part 24d than in the upper part 24c. Alternatively, for example, as shown in FIG. 8B, the inner face of the cup portion 61f of the case 61 may be made a cylindrical shape (namely, the shape without a tapered surface), and the outer diameter of the damping member 24b may be larger in a lower part 24d than in an upper part 24c. In order to control the vibration to swing the stud 23 as described above, it is suitable to make the clearance H1 smaller as it goes away from the center of the swing.

The shape of the damping member 24 and 24b is not limited to the cup shape as described above, and it may be in a columnar shape, or a shape of the letter H in section having recessed portions opened upward and downward, and the same damping effects and the swing vibration control effects as described above can be obtained with these shapes. In the first to fourth embodiment explained above, the explanation is made with the examples in which the damping plates 15 and 25 are restrained in the downward movement by the steps 11e, 21e, 51e and 61e, but the constitution in which they are connected to the undersurfaces of the elastic bodies 16 and 26 may be suitable. In this case, the steps 51e and 61e become unnecessary.

Figure 9:
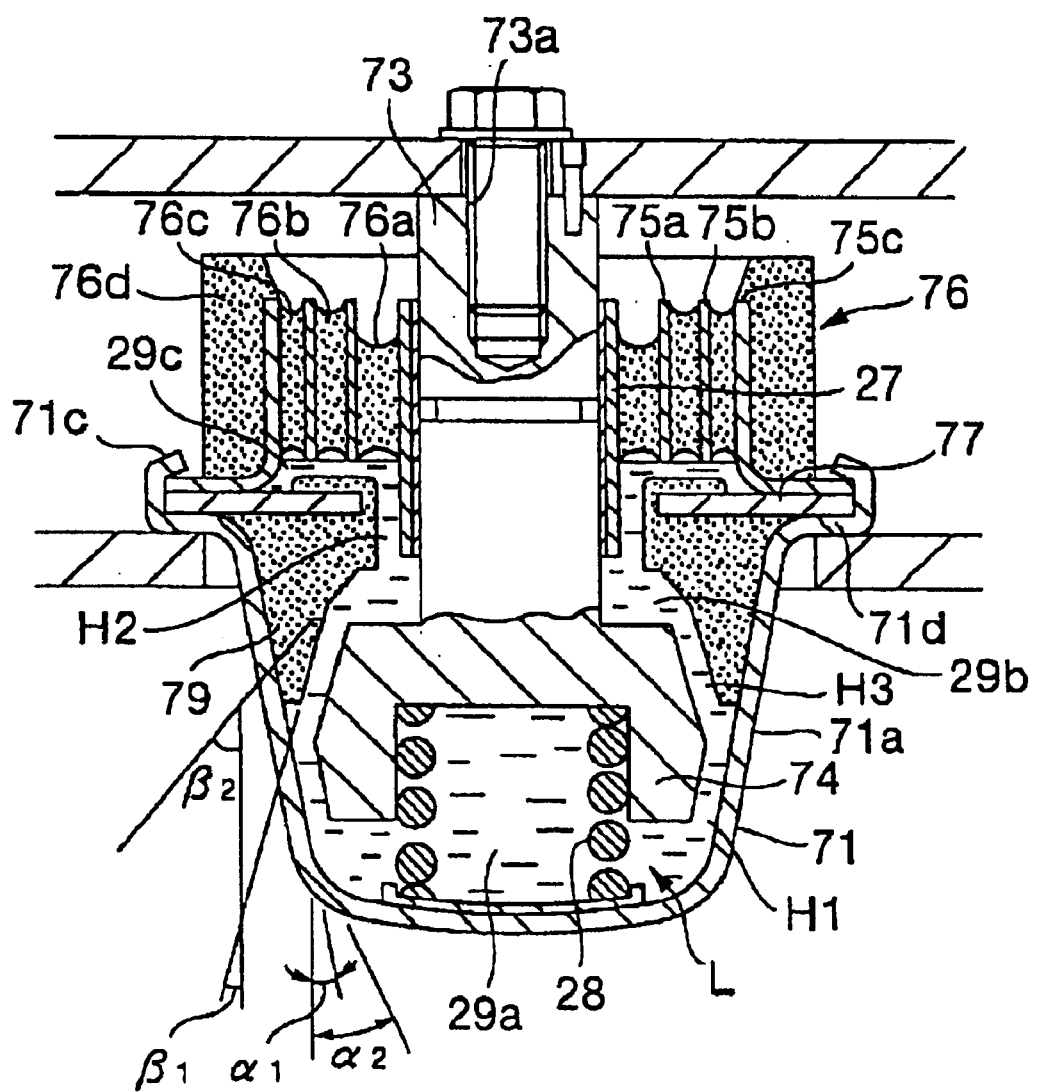
FIG. 9 is a sectional view showing a fifth embodiment of the present invention.

Next, a fifth embodiment will be explained based on FIG. 9. The same reference numerals and symbols are given to the same components as those in the above. In FIG. 9, a case 71 has a cup portion 71a opened upward, and a mounting plate 71d provided with a mounting hole (not shown) and a fixing claw 71c. The case 71 at the lower part from the mounting plate 71d is in a tapered shape in which an inner diameter gradually becomes smaller toward a lower position, which is inclined at an angle of inclination α1 up to a position with a predetermined height, and is inclined at an angle of inclination α2 (note that α1<α2) at the lower part from the position with the predetermined height.

A damping member 74 fixed to a lower end of a stud 73 is housed in an inside of the case 71. The damping member 74 forms a cup shape opened downward, and forms a tapered portion opposing the tapered surface at the upper part of the case 71 and having a substantially equal angle of inclination to the angle of inclinations α1, and forms a ring clearance H1 between an outer circumferential side surface thereof and the case 71. An upward tapered portion inclined at an angle of inclination β1 is formed at an upper part of the outer circumferential side surface of the damping member 74. It is set that α1≦β1. Further, a small hole (not shown) is provided in a bottom face of the damping member 74 to release air remaining inside the cup shape of the damping member 74 upward after the viscous liquid is sealed.

A coil spring 28 is provided between the case 71 and the damping member 74. The damping member 74 in the cup shape also has a function as a retainer to prevent the lateral displacement of the coil spring 28. The stud 73 forms a cylindrical shape having a screw hole 73a in a center of a top end portion, and is slidably fitted inside the sleeve 27. The sleeve 27 has a scraper and an oil seal (both are not shown) attached in an inner face of the upper end portion and the lower end portion as in the above description. An elastic body 76 constructed in a cylindrical form has a laminated constitution in which a plurality of laminated elastic bodies 76a, 76b, 76c and 76d are concentrically laminated and bonded in a ring form outside the sleeve 27 via a plurality of cylindrical plates 75a, 75b and 75c. The laminated elastic bodies 76a, 76b, 76c and 76d are molded of rubber, resin or the like.

A disc-shaped plate 77 is integrally fixed and placed by a fixing claw 71c with the mounting plate 71d of the case 71 and the cylindrical plate 75c at an outside in the lower part of the elastic body 76. A hole with a little larger diameter than an outer diameter of the sleeve 27 is formed in a center portion of the plate 77, an elastic body 79 is bonded to the aforementioned center hole portion and an undersurface of the plate 77, and the sleeve 27 is inserted in the aforementioned center hole. A ring-shaped clearance H2 is formed between the sleeve 27 and the elastic body 79 provided at the aforementioned center hole portion.

At a lower part of the elastic body 79, formed is a ring-shaped tapered surface opposing a tapered portion at an angle of inclination β1, which is formed at the top portion of the outer circumferential side surface of the damping member 74 and is inclined substantially at the angle of inclination β1, and at the upper part continuing the above, formed is a ring-shaped tapered surface which is inclined at an angle of inclination β2 (note that β1<β2, α2≦β2). A ring-shaped clearance H3 is formed between the elastic body 79 and the upper part of the outer circumferential side surface of the damping member 74.

A viscous liquid L such as silicone oil is sealed up to a midpoint of a space between the elastic body 76 and the plate 77, inside the case 71 sealed by the elastic body 76, the stud 73 and the elastic body 79, and an air chamber sealed by the viscous liquid L is formed at the upper part inside the above-described space.

According to the above constitution, an oil sealed chamber inside the case 71 is divided into an A chamber 29a, a B chamber 29b, and a C chamber 29c from a lower position by the damping material 74, and the elastic body 79 that is bonded to the plate 77. The A chamber 29a and the B chamber 29b communicate with each other via the ring-shaped clearance H1 and the ring-shaped clearance H3, and the B chamber 29b and the C chamber 29c communicate with each other via the ring-shaped clearance H2. The C chamber 29c includes the aforementioned air chamber.

According to the fifth embodiment, following the vertical motion of the stud 73, the clearance H1 between the damping member 74 and the case 71, and the clearance H3 between the damping member 74 and the elastic body 79 are gradually increased and decreased, and therefore the damping force, which is caused by the pressure loss by throttling of the viscous liquid L in the upper and lower clearances H1 and H3, is increased and decreased. Namely, as shown in FIG. 5, following the descent of the damping member 74 from a neutral position which is balanced with a load of the driver's cab, the clearance H1 smoothly becomes narrow at the angle of inclination α1 of the tapered surface of the case 71, and when it reaches the range of the angle of inclination α2, the clearance H1 sharply becomes narrower than the above. Accordingly, the damping force changes in two stages, and becomes large before the stroke end to cushion the impact occurring at the time of abutment against the stopper. Following the ascent from the neutral position, the damping force is gradually increased in the same manner, and the damping force becomes larger before abutment against the stopper. Accordingly, in this situation, the inclination of the increase in the damping force in the ascending direction is larger than the inclination of the increase in the damping force in the descending direction (namely, α1≦β1, α2≦β2), and therefore it conforms to a sense of comfort of a human being (operator) at the time of cushioning vibrations.

It is suitable if only the inner diameter of the case 71 gradually becomes smaller toward the lower position and it is in the tapered shape with the different angles of inclination in the upper and the lower parts, and it may be in a tapered shape of a curved surface with different angles of inclination in the upper and the lower parts. The ring-shaped tapered surface formed at the lower part of the elastic body 79 may be a tapered shape of a curved surface with different angles of inclination in the upper and lower parts. Thereby, the damping force is increased more smoothly than in the case with a tapered surface in which the angle of inclination changes stepwise. The shape of the damping member 74 is not limited to the cut shape as described above, but it may be, for example, a columnar shape, or a shape of the letter H in section having recessed portions opened upward and downward, and with these shapes, the same damping effect and swing vibration control effect as described above can be obtained.

In the first to the fifth embodiment explained thus far, it is natural that the dimension of the diameter of the damping member, diameter of the case, and the like, and characteristics of the elastic body and the viscous liquid and the like can be changed according to the specification. The aforementioned air chambers are formed by the recessed portions on the undersurface of the elastic bodies 16, 26 and 76, but they are not limited to this, and the air chambers may be formed by, for example, the elastic bodies 26 and 76 and the sleeve 27, or the elastic bodies 16, 26 and 76 and the studs 13 and 23. Further, it is suitable if the clearance H2 separates the B chamber 29b and the C chamber 29c to form the above-described air chamber, and accordingly, it may be formed by the damping plates 15 and 25 and the elastic bodies 16 and 26, the damping plates 15 and 25 and the studs 13 and 23, the damping plates 15 and 25 and the sleeve 27, the elastic body 79 and the stud 73, or the elastic body 79 and the sleeve 27. Further, the damping plates 15, 25 and the like are attached to the step portions of the case, but they may be attached to a pin or protruded member which are protruded inward from, for example, the case without being limited to the above constitution.

As explained thus far, according to the present invention, the damping plate fixed to the case side is included above the damping member attached to the stud, and therefore even when the upward load is exerted on the stud, the upper side of the damping member at the stud side can be made high pressure as in the lower side of the damping member when the downward load is exerted on the stud. As a result, a large pressure difference can be caused to occur on both sides of the damping member at the side of the stud, and the same large damping force can be obtained when the stud is moved upward as when the stud is moved downward.

In this situation, the damping force gradually becomes large according to the stroke amount of the ascent or the descent of the stud, and therefore the damping force is surely caused to damp the vibration even if the amplitude of the vibration is large. Further, the damping force can be increased before the stroke end of the damping member to lessen the impact at the stroke end, and therefore the comfort of the driver's cab can be improved.

Since the clearance between the damping member and the outer circumferential side surface of the damping member becomes smaller in the upper part than in the lower end portion, the reaction force received from the case wall surface via the viscous liquid L is larger in the lower part, and the resultant force thereof is applied to the lower side of the damping member. As a result, to the rotation moment caused by the vibration applied laterally to the upper end portion of the stud, the moment in the direction to reduce this occurs at the lower side of the damping member, and therefore the effect of controlling the lateral vibration is large. Since a large pressure difference can be caused to occur on both sides of the damping member at the side of the stud, occurrence of cavitation can be prevented even when a large load in the upward direction acts on the stud, and thereby a large damping force can be obtained with stability. Consequently, the liquid mount having excellent damping performance can be obtained.

What is claimed is:

1. A liquid-sealed mount, comprising:
   an elastic body;
   a stud penetrating through said elastic body;
   a case, which is in a cylindrical shape with one end side being opened and with a bottom face on the other end side, and houses a viscous liquid inside, and which said viscous liquid is sealed in by fitting said elastic body and said stud into the opening at said one end side; and
   a damping member attached to said stud in a state in which the damping member submerges in said viscous liquid,
     wherein a wall surface of a portion of said case, which submerges in said viscous liquid, is formed so that an inner diameter gradually decreases toward a lower position and an angle of inclination is different in an upper part from a lower part; and
     wherein an outer circumferential side surface of said damping member opposes the inclined surface of said case.

2. The liquid-sealed mount according to claim 1, wherein an outer diameter of said damping member is larger in a lower part than in an upper part.

* * * * *